United States Patent
Zsoldos et al.

(10) Patent No.: US 10,344,644 B2
(45) Date of Patent: Jul. 9, 2019

(54) ENGINE ARRANGEMENT AND METHOD FOR HEATING EXHAUST AFTER TREATMENT EQUIPMENT IN AN EXHAUST AFTER TREATMENT SYSTEM

(71) Applicant: VOLVO TRUCK CORPORATION, Göteborg (SE)

(72) Inventors: Jeffrey Zsoldos, Knoxville, MD (US); Russell Giasomo, Mont Alto, PA (US)

(73) Assignee: Volvo Truck Corporation, Göteborg (SE)

(*) Notice: Subject to any disclaimer, the term of this patent is extended or adjusted under 35 U.S.C. 154(b) by 108 days.

(21) Appl. No.: 15/037,581

(22) PCT Filed: Dec. 19, 2013

(86) PCT No.: PCT/IB2013/003214
§ 371 (c)(1),
(2) Date: May 18, 2016

(87) PCT Pub. No.: WO2015/092475
PCT Pub. Date: Jun. 25, 2015

(65) Prior Publication Data
US 2016/0290198 A1    Oct. 6, 2016

(51) Int. Cl.
*F02B 27/04* (2006.01)
*F01N 3/18* (2006.01)
(Continued)

(52) U.S. Cl.
CPC ............. *F01N 3/18* (2013.01); *F01N 3/021* (2013.01); *F01N 3/2006* (2013.01);
(Continued)

(58) Field of Classification Search
CPC ............. F02D 41/0255; F02D 41/0007; F01N 3/2006; F02B 41/10
(Continued)

(56) References Cited

U.S. PATENT DOCUMENTS 4,748,812 A    6/1988  Okada et al.
4,897,998 A    2/1990  Sekiyama et al.
(Continued)

FOREIGN PATENT DOCUMENTS

DE    10349164 A1    5/2004
DE    10355563 A1    6/2005
(Continued)

OTHER PUBLICATIONS

International Search Report (dated Jul. 24, 2014) for corresponding International App. PCT/IB2013/003214.
(Continued)

*Primary Examiner* — Jason D Shanske
(74) *Attorney, Agent, or Firm* — WRB-IP LLP

(57) ABSTRACT

An engine arrangement includes an engine (23), an exhaust line (25) connected downstream of the engine, exhaust after treatment equipment (27) in the exhaust line, a temperature sensor (29a-29e) for sensing a temperature of the exhaust after treatment equipment, and a turbo compound arrangement (37) including a turbo compound turbine (39) in the exhaust line. Exhaust flow through the turbo compound arrangement and the exhaust line is modified in response to one or more temperature sensor signals to increase heating of the exhaust after treatment equipment.

27 Claims, 1 Drawing Sheet

(51) Int. Cl.
*F02B 41/10* (2006.01)
*F02D 41/02* (2006.01)
*F02D 41/00* (2006.01)
*F01N 3/20* (2006.01)
*F01N 3/021* (2006.01)
*F02B 37/013* (2006.01)
*F02B 37/18* (2006.01)
*F02B 37/00* (2006.01)

(52) U.S. Cl.
CPC .......... *F01N 3/2066* (2013.01); *F02B 37/013* (2013.01); *F02B 37/183* (2013.01); *F02B 41/10* (2013.01); *F02D 41/0007* (2013.01); *F02D 41/0255* (2013.01); *F01N 2260/04* (2013.01); *F01N 2260/14* (2013.01); *F01N 2560/06* (2013.01); *F02B 37/00* (2013.01); *F02D 2041/026* (2013.01); *F02D 2200/0802* (2013.01); *F02D 2250/34* (2013.01); *Y02T 10/144* (2013.01); *Y02T 10/163* (2013.01); *Y02T 10/26* (2013.01)

(58) Field of Classification Search
USPC .......................................................... 60/273
See application file for complete search history.

(56) References Cited

U.S. PATENT DOCUMENTS

| | | |
|---|---|---|
| 5,119,633 A | 6/1992 | Brooks et al. |
| 5,142,868 A | 9/1992 | Woon et al. |
| 2007/0272052 A1* | 11/2007 | Adleff ................ F02B 33/34 74/720 |
| 2011/0196587 A1* | 8/2011 | Arnell ................ F02B 41/10 701/60 |

FOREIGN PATENT DOCUMENTS

| | | |
|---|---|---|
| EP | 2341225 A1 | 7/2011 |
| WO | 9209797 A1 | 6/1992 |
| WO | 2005068800 A1 | 7/2005 |
| WO | 2012021102 A1 | 2/2012 |

OTHER PUBLICATIONS

International Preliminary Report on Patentability (dated Feb. 22, 2016) for corresponding International App. PCT/IB2013/003214.

* cited by examiner

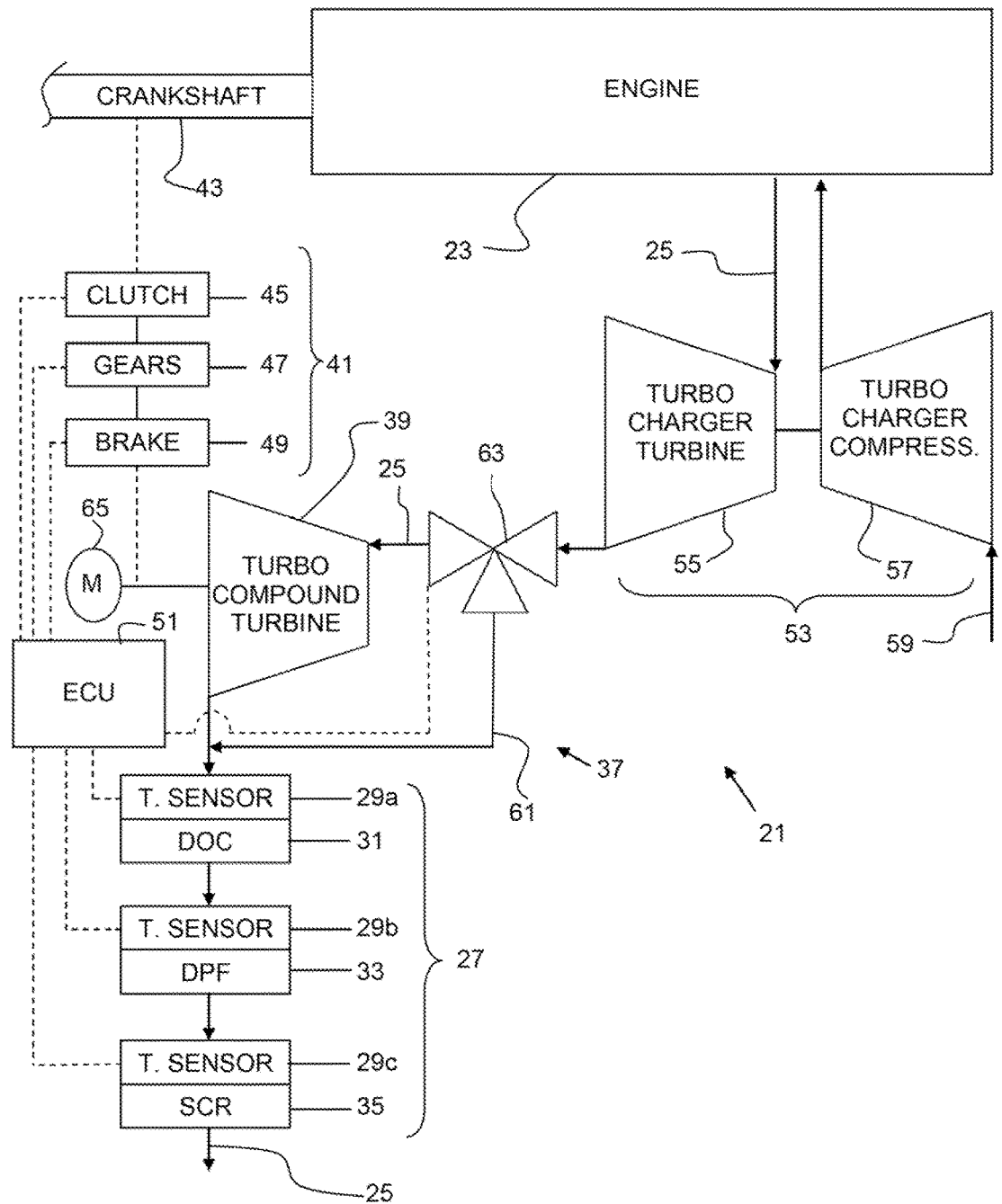

ENGINE ARRANGEMENT AND METHOD FOR HEATING EXHAUST AFTER TREATMENT EQUIPMENT IN AN EXHAUST AFTER TREATMENT SYSTEM

BACKGROUND AND SUMMARY

Aspects of the present invention relate to an engine arrangement and a method for heating exhaust after treatment equipment in an exhaust after treatment system Diesel engines are often provided with exhaust after treatment equipment to satisfy various environmental regulations. The aftertreatment equipment may comprise lone devices but is more typically part of a larger exhaust after treatment system (EATS) of the type that typically comprises a plurality of different components, such as a diesel oxidation catalyst (DOC), a diesel particulate filter (DPF) which may include a catalyst, and a selective catalytic reduction catalyst (SCR). Ordinarily, each of the components of the EATS has an optimal operating temperature range, such as a range at which any catalyst associated with the component performs optimally, and some components do not perform their intended functions below particular temperatures. Particularly during start-up of the engine or during operation in cold weather, the engine and the exhaust after treatment equipment are at temperatures below the optimal operating temperatures, and may be operated at temperatures so low as to damage the equipment. To avoid damage, it may be necessary to bypass components of the EATS. If the EATS components are not operating optimally or are bypassed, it may not be possible for the engine arrangement to attain desired emissions levels. Additionally, it is periodically necessary to regenerate certain EATS components, such as DPFs and SCRs, at higher temperatures than are typically encountered under normal operating conditions. There are presently a number of different arrangements and techniques for more rapidly increasing heating of EATS components and/or generally increasing temperatures of EATS components to provide a "heat mode" such as via use of such devices as variable geometry turbochargers, intake throttles on diesel engines, exhaust restricting devices such as flappers and butterfly valves, and introducing fuel into the exhaust combined with a diesel oxidation catalyst, and/or exhaust burner devices. Many of these structures for providing a heat mode only function to assist in providing the heat mode and do little or nothing else. It is desirable to provide additional arrangements and techniques to supplement or replace existing arrangements and techniques for raising temperature of EATS components to minimal or optimal operating ranges and/or for purposes of regeneration. It is also desirable to minimize the size of the arrangement for providing a heat mode.

An engine arrangement according to an aspect of the present invention comprises an engine, an exhaust line connected downstream of the engine, exhaust after treatment equipment in the exhaust line, a temperature sensor for sensing a temperature of the exhaust after treatment equipment, and a turbo compound arrangement including a turbo compound turbine in the exhaust line and means for modifying exhaust flow through the turbo compound arrangement and the exhaust line in response to one or more temperature sensor signals.

In accordance with another aspect of the invention, a method is provided for heating exhaust after treatment equipment in an exhaust after treatment system (EATS) for an engine. The method comprises exhausting gas from the engine into an exhaust line downstream of the engine, the exhaust line including the exhaust after treatment system including the exhaust after treatment equipment, the exhaust line further including a turbo compound arrangement including a turbo compound turbine, sensing temperature of the exhaust after treatment equipment, and modifying exhaust gas flow through the turbo compound arrangement in response to one or more temperature sensor signals.

BRIEF DESCRIPTION OF THE DRAWINGS

The features and advantages of the present invention are well understood by reading the following detailed description in conjunction with the drawing in which like numerals indicate similar elements and in which the drawing is a schematic drawing of an engine arrangement according to an aspect of the present invention.

DETAILED DESCRIPTION

The drawing shows an engine arrangement 21 according to an aspect of the present invention that comprises an engine 23, an exhaust line 25 connected downstream of the engine, exhaust after treatment equipment 27 in the exhaust line, and a temperature sensor for sensing a temperature of the exhaust after treatment equipment. The exhaust after treatment equipment 27 may comprise a single device, but is typically part of a larger exhaust after treatment system (EATS) of the type that typically comprises a plurality of different components, such as a diesel oxidation catalyst (DOC) 31, a diesel particulate filter (DPF) 33 which may include a catalyst, and a selective catalytic reduction catalyst (SCR) 35. The temperature sensor may comprise separate sensors 29a, 29b, and 29c associated with one, some, or each of the various components of the EATS.

A turbo compound arrangement 37 including a turbo compound turbine 39 is also provided in the exhaust line 25. The turbo compound turbine 39 is drivingly connected or connectable via a power transmission arrangement 41 to a crankshaft 43 of the engine 23. The conventional application of the turbo compound turbine 39 is to be driven by exhaust gas in the exhaust line 25 to recover energy in the exhaust gas and return it to the crankshaft 43, which increases output of the engine without increasing its fuel consumption.

The turbo compound arrangement 37 further includes means for modifying exhaust flow through the turbo compound arrangement and the exhaust line 25 in response to one or more temperature sensor signals. By modifying exhaust flow through the turbo compound arrangement 37 and the exhaust line 25, it is possible to more rapidly increase the temperature of one or more EATS components by developing increased backpressure in the exhaust line and/or increasing a load on the engine 23 at a given speed of the engine. When one or more temperature sensors 29a, 29b, 29c provides a signal indicating that a temperature of exhaust after treatment equipment 27 such as a DOC, a DPF, or an SCR is too low, the modifying means can be controlled to rapidly increase temperature of the one or more components until the temperature sensor or sensors provides another signal indicating that the temperature of the exhaust after treatment equipment is at a desired level. In addition to more rapidly increasing temperature of the exhaust to temperatures for optimal operation of the EATS components via the modifying means, the modifying means may be used to increase temperatures above normal operating temperatures, such as for purposes of regeneration of a DPF 33 or an SCR 35.

The drawing shows an embodiment including several different forms of modifying means that may be provided in together and may complement one another, as illustrated, or that may be provided separately. They are not, in other words, necessarily mutually exclusive except as otherwise provided. The illustrated modifying means includes one modifying means that comprises a means for reducing rotational speed of the turbo compound turbine 39. The turbo compound turbine 39 is drivingly connected to the crankshaft 43 of the engine by any suitable power transmission arrangement, such as via a clutch 45 and/or engageable and disengageable gears 47, and the reducing means comprises a brake 49 for braking rotation of the turbo compound turbine. The brake 49 may be arranged so as to only apply sufficient resistance to movement of the turbo compound turbine 39 to prevent energy from being returned to the crankshaft 43 of the engine 23 so that the engine must work harder and heat up more quickly to achieve the same output at a given speed of the engine that it would otherwise produce with less expenditure of energy if the turbo compound turbine were recovering energy from the exhaust.

The turbo compound turbine 39 and the crankshaft 43 might be completely disengaged such as by disengaging the clutch 45 and/or any gears 47 forming a power transmission arrangement between the turbo compound turbine and the crankshaft when the brake 49 is applied. In this way, in addition to not returning any energy from the exhaust to the crankshaft, the braking of the turbo compound turbine 39 can produce a backpressure in the exhaust line 25 that can result in more rapid increase of temperature by causing the engine to have to work harder at the given speed to overcome the backpressure.

The turbo compound turbine 39 and the crankshaft 43 might further remain engaged via the clutch 45 and/or any gears 47 forming a power transmission arrangement between the turbo compound turbine and the crankshaft when the brake 49 is applied. In this way, in addition to not returning any energy from the exhaust to the crankshaft, and in addition to the braking of the turbo compound turbine 39 producing a backpressure in the exhaust line 25 that can result in more rapid increase of temperature by causing the engine to have to work harder at the given speed to overcome the backpressure, the braking of the turbo compound turbo can brake the crankshaft 43 which can further increase a load on the engine so that the engine must work harder at the given speed to turn the crankshaft.

The means for reducing rotational speed of the turbo compound turbine 39, i.e., the brake 49 and/or components of the power transmission arrangement 41 such as the clutch 45 and/or gears 47 can be controlled to increase the load on the engine 23 in response to one or more signals from the one or more temperature sensors 29a, 29b, 29c. Typically, the temperature sensors 29a, 29b, 29c will send signals to a central control unit such as an engine control unit (ECU) 51 which is programmed to control the means for reducing rotational speed of the turbo compound turbine 39 by operating the brake 49 to brake the turbo compound turbine. The ECU 51 can also be programmed to disengage or engage the clutch 45 and/or gears 47 of the power transmission arrangement 41 as appropriate under the particular circumstances to produce an overall desired increase of the load on the engine 23.

The engine arrangement 21 will also typically include a turbocharger arrangement 53 including a turbine 55 in the exhaust line 25 upstream of the turbo compound arrangement 37. The turbine 55 is drivingly connected to a compressor 57 in an intake line 59 of the engine arrangement 21 and uses energy in the exhaust gas from the engine 23 to drive the compressor to force pressurized air into the cylinders of the engine.

Another form of modifying means modifies flow through the turbo compound arrangement by reducing flow through the turbo compound arrangement 37 and the exhaust line 25 in response to a temperature sensor signal that the temperature of the exhaust after treatment equipment 27 (or one or more components of the equipment) is below a predetermined value to increase backpressure in the exhaust line 25 upstream of the turbo compound turbine 39. The modifying means can further modify flow through the turbo compound arrangement 37 by increasing flow through the turbo compound arrangement and the exhaust line 25 in response to a temperature sensor signal that the temperature of the exhaust after treatment equipment 27 is at or above a predetermined value to decrease backpressure in the exhaust line upstream of the turbo compound turbine 39. The modifying means may comprise a bypass conduit 61 connected to the exhaust line 25 upstream of the turbo compound turbine 39 and a bypass valve 63 movable from an open position in which flow to the turbo compound turbine is unrestricted and the bypass conduit is closed to a bypass position in which flow through the turbo compound turbine is restricted and the bypass conduit is opened. This will ordinarily be achieved by providing a bypass conduit 61 of a diameter such that, when the bypass valve 63 is in the bypass position, flow through the turbo compound turbine 39 and the bypass conduit together is less than flow through the turbo compound turbine when the bypass valve is in the open position. If desired, additional modification of flow through the turbo compound turbine arrangement can be achieved by braking rotation of the turbo compound turbine via the brake 49.

Yet another form of modifying means comprises means for reversing a direction of rotation of the turbo compound turbine 39. The reversing means may comprise components of the power transmission arrangement 41 connecting the turbo compound turbine 39 to the crankshaft 43 of the engine 23, such as gears 47 that are shiftable between a forward drive condition in which the turbo compound turbine is driven in a forward direction by gas flowing through the turbo compound turbine and thereby recovers energy from the exhaust gas that can be transmitted via the power transmission arrangement back to the crankshaft and a reverse drive condition in which the crankshaft or some other apparatus drives the turbo compound turbine in a reverse direction opposite the direction of flow of gas through the turbo compound turbine. The gears 47 may be of any suitable type and may be synchronized or not. Typically, a clutch 45 will be provided with the gears 47 to avoid instantaneous reversal of direction of the turbo compound turbine 39 when the gears are shifted. The power transmission arrangement 41 connecting the turbo compound turbine 39 to the crankshaft 43 of the engine 23 can also or alternatively be shiftable between the forward drive condition and a neutral drive condition in which the crankshaft and the turbo compound turbine are disengaged or a reverse drive condition in which the direction of rotation of the turbo compound turbine generates flow in a direction opposite the normal direction of flow of exhaust gas. Thus, the power transmission arrangement 41 may be of the type that permits normal rotation of the turbo compound turbine 39 in the forward direction to recover energy from the exhaust and/or a reverse drive condition in which the crankshaft 43 drives the compound turbine in the reverse direction and/or a neutral drive condition in which the crankshaft and the turbo compound turbine are disengaged.

When the turbo compound turbine 39 is driven by the exhaust gas in the exhaust line 25 in the forward direction, the turbine will cause some backpressure to develop in the exhaust line as the turbo compound turbine recovers energy to be transmitted to the crankshaft 43. When the turbo compound turbine 39 is disengaged from the crankshaft 43, it will typically still be turned by the exhaust gas in the exhaust line and will therefore typically cause some backpressure to develop in the exhaust line 25, however, that amount will typically be less than the backpressure that develops when the turbo compound turbine and the crankshaft are engaged via the power transmission arrangement 41. When the turbo compound turbine 39 is driven in the reverse direction by the crankshaft 43 through the power transmission arrangement 41, in addition to energy required from the engine 23 overcome backpressure that develops in the exhaust line 25 as the result of flow generated in a direction opposite the normal direction of flow of exhaust gas in the exhaust line, energy is required from the engine in order to turn the turbo compound turbine.

In addition to or instead of a forward and reverse gear arrangement, the reversing means may comprise a motor 65 separate from the engine 23 for driving the turbo compound turbine 39 in a reverse direction. The power transmission arrangement 41 can be in the neutral drive condition when the motor 65 drives the turbo compound turbine 39 in the reverse direction, or in the reverse drive condition.

In a method according to an aspect of the present invention, exhaust after treatment equipment 27 in an exhaust after treatment system (EATS) for the engine 23 is heated by exhausting gas from the engine into the exhaust line 25 downstream of the engine, the exhaust line including the exhaust after treatment system including the exhaust after treatment equipment, the exhaust line further including a turbo compound arrangement 37 including a turbo compound turbine 39. Temperature of the exhaust after treatment equipment 27 (e.g., one or more of the DOC 31, the DPF 33, and the SCR 35) is sensed by one or more sensors 29a, 29b, 29c for the equipment. One or more signals indicative of whether a temperature of the equipment is below, at, or above a predetermined value is typically sent to the ECU 51 to determine how to respond to the signals. Exhaust gas flow through the turbo compound arrangement 39 is modified in response to one or more temperature sensor signals.

In response to a temperature sensor signal that the temperature of the exhaust after treatment equipment 27 is below a predetermined value, exhaust gas flow through the turbo compound turbo 39 is modified to increase backpressure in the exhaust line 25 upstream of the turbo compound turbine and/or increase the load on the engine 23 to achieve the same output at the same speed as when energy is recovered by the turbo compound turbine and transmitted to the crankshaft 43. In this way, exhaust gas temperatures will tend to rise, more rapidly heating the exhaust after treatment equipment 27. When the one or more sensors 29a, 29b, 29c produce one or more temperature sensor signal that the temperature of the exhaust after treatment equipment 27 is at or above a predetermined value, exhaust gas flow through the turbo compound arrangement 37 can again be modified to decrease backpressure in the exhaust line 25 and/or decrease the load on the engine.

The modification of exhaust gas flow through the turbo compound turbine 39 for heating of exhaust after treatment equipment 27 can be achieved by reducing rotational speed of the turbo compound turbine. This can be achieved by, for example, braking rotation of the turbo compound turbine 39 via a brake 49. Thus, the brake 49 can at least apply sufficient resistance to movement of the turbo compound turbine to prevent energy recovered from exhaust gas in the exhaust line 25 from being returned to the crankshaft 23. Application of the brake 49 will also typically increase backpressure in the exhaust line 25. If the turbo compound turbine 39 is drivingly connected to the crankshaft 43 through the power transmission arrangement 41, braking of the turbo compound turbine will typically also function to brake the crankshaft. In that situation, applying the brake 49 can provide sufficient resistance to movement of the turbo compound turbine 39 to place an increased load on the engine 23 by making it more difficult to turn the crankshaft, as well as by increasing backpressure in the exhaust line 25.

The modification of exhaust gas flow through the turbo compound turbine 39 for heating of exhaust after treatment equipment 27 may additionally or alternatively be accomplished by restricting flow through the turbo compound arrangement and the exhaust line 25, which will typically increase backpressure and/or increase load on the engine. The modification of exhaust gas flow through the turbo compound turbine 39 when the exhaust after treatment equipment 27 is at a desired temperature or it is no longer desired to increase heating of the equipment can be achieved by removing the restriction on flow through the turbo compound arrangement and the exhaust line to decrease backpressure in the exhaust line upstream of the turbo compound turbine and/or decrease the load on the engine 23.

To restrict flow, the turbo compound arrangement 37 can comprise the bypass conduit 61 connected to the exhaust line 25 upstream of the turbo compound turbine 39 and the bypass valve 63 movable from the open position in which flow to the turbo compound turbine 39 is unrestricted and the bypass conduit is closed to a bypass position in which flow through the turbo compound turbine is restricted and the bypass conduit is opened. To restrict flow through the turbo compound arrangement and the exhaust line generally, the bypass valve 63 is moved to the bypass position. It will be appreciated that the bypass valve 63 may also be moved to a position between fully open and fully closed. Preferably, flow through the bypass conduit 61 and the turbo compound turbine 39 when the bypass valve 63 is in the bypass position is more restricted than when the bypass valve is in the open position and all flow is through the turbo compound turbine.

The modification of exhaust gas flow through the turbo compound turbine 39 for heating of exhaust after treatment equipment 27 may additionally or alternatively be accomplished by reversing a direction of rotation of the turbo compound turbine 39. The direction of rotation of the turbo compound turbine 39 may be reversed by turning the turbo compound turbine with a motor 65 separate from the engine for driving the turbo compound turbine in a reverse direction. The turbo compound turbine 39 will typically either be disengaged from the crankshaft 43 or will be driven by the crankshaft in the reverse direction through the power transmission arrangement 41 when the motor 65 is used to drive the turbo compound turbine in the reverse direction. After the motor 65 is used to drive the turbo compound turbine 39 in the reverse direction, or at other times, the motor may drive the turbo compound turbine in a forward direction, such as to facilitate spinning the turbo compound turbine back up to crank speed, which can improve durability.

While the engine arrangement 21 and method described herein can be used alone to increase heat of exhaust in the exhaust line for purposes such as increasing temperature of EATS components to minimal or optimal temperature ranges or for increasing temperatures to levels necessary for regeneration of the components, it will be appreciated that they may also supplement or replace existing arrangements and techniques for raising temperature of EATS components to minimal or optimal operating ranges and/or for purposes of regeneration. Thus, the engine arrangement 21 and method can supplement or replace use of such devices as variable geometry turbochargers, intake throttles on diesel engines, exhaust restricting devices such as flappers and butterfly valves, and introducing fuel into the exhaust combined with a diesel oxidation catalyst, and/or exhaust burner devices.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. An engine arrangement, comprising:
   an engine;
   an exhaust line connected downstream of the engine;
   exhaust after treatment equipment in the exhaust line;
   a temperature sensor for sensing a temperature of the exhaust after treatment equipment; and
   a turbo compound arrangement including a turbo compound turbine in the exhaust line and means for modifying exhaust flow through the turbo compound arrangement and the exhaust line in response to one or more temperature sensor signals to achieve an exhaust temperature sufficient for regeneration of the exhaust after treatment equipment.

2. The engine arrangement as set forth in claim 1, wherein the modifying means modifies flow through the turbo compound arrangement by reducing flow through the turbo compound arrangement and the exhaust line in response to a temperature sensor signal that the temperature of the exhaust after treatment equipment is below a predetermined value to increase backpressure in the exhaust line upstream of the turbo compound turbine.

3. The engine arrangement as set forth in claim 1, wherein the modifying means modifies flow through the turbo compound arrangement by increasing flow through the turbo compound arrangement and the exhaust line in response to a temperature sensor signal that the temperature of the exhaust after treatment equipment is at or above a predetermined value to decrease backpressure in the exhaust line upstream of the turbo compound turbine.

4. The engine arrangement as set forth in claim 1, wherein the modifying means comprises a means for reducing rotational speed of the turbo compound turbine.

5. The engine arrangement as set forth in claim 4, wherein the turbo compound turbine is drivingly connected to a crankshaft of the engine, and the reducing means comprises a brake for braking rotation of the turbo compound turbine.

6. The engine arrangement as set forth in claim 5 wherein the brake is arranged to apply sufficient resistance to movement of the turbo compound turbine to prevent energy from being returned to the crankshaft.

7. The engine arrangement as set forth in claim 5, wherein the brake is arranged to apply sufficient resistance to movement of the turbo compound turbine to increase a load on the engine.

8. The engine arrangement as set forth in claim 1, wherein the modifying means comprises a bypass conduit connected to the exhaust line upstream of the turbo compound turbine and a bypass valve movable from an open position in which flow to the turbo compound turbine is unrestricted and the bypass conduit is closed to a bypass position in which flow through the turbo compound turbine is restricted and the bypass conduit is opened.

9. The engine arrangement as set forth in claim 8, wherein, when the bypass valve is in the bypass position, flow through the turbo compound turbine and the bypass conduit together is less than flow through the turbo compound turbine when the bypass valve is in the open position.

10. The engine arrangement as set forth in claim 1, wherein the modifying means comprises means for reversing a direction of rotation of the turbo compound turbine.

11. The engine arrangement as set forth in claim 10, wherein the reversing means comprises a power transmission arrangement connecting the turbo compound turbine to a crankshaft of the engine, the power transmission arrangement being shiftable between a forward drive condition in which the turbo compound turbine is driven in a forward direction by gas flowing through the turbo compound turbine, a reverse drive condition in which the turbo compound turbine is driven in a direction opposite the forward direction by the crankshaft through the power transmission arrangement, and a neutral drive condition in which the crankshaft and the turbo compound turbine are disengaged.

12. The engine arrangement as set forth in claim 10, wherein the reversing means comprises a motor separate from the engine for driving the turbo compound turbine in a reverse direction when the power transmission arrangement is shifted to the one of the reverse drive condition and the neutral drive condition.

13. The engine arrangement as set forth in claim 12, wherein the motor is adapted to drive the turbo compound turbine in a forward direction.

14. The engine arrangement as set forth in claim 1, wherein the modifying means comprises a power transmission arrangement connecting the turbo compound turbine to a crankshaft of the engine, the power transmission arrangement being shiftable between a forward drive condition in which the turbo compound turbine is driven in a forward direction by gas flowing through the turbo compound turbine and at least one of a reverse drive condition in which the turbo compound turbine is driven in a direction opposite the forward direction, and a neutral drive condition in which the crankshaft and the turbo compound turbine are disengaged.

15. The engine arrangement as set forth in claim 14, wherein the modifying means comprises a motor separate from the engine for driving the turbo compound turbine in a reverse direction when the power transmission arrangement is shifted to the one of the reverse drive condition and the neutral drive condition.

16. A method for heating exhaust after treatment equipment in an exhaust after treatment system (EATS) for an engine, comprising:
   exhausting gas from the engine into an exhaust line downstream of the engine, the exhaust line including the exhaust after treatment system including the exhaust after treatment equipment, the exhaust line further including a turbo compound arrangement including a turbo compound turbine;

sensing temperature of the exhaust after treatment equipment; and modifying exhaust gas flow through the turbo compound arrangement in response to one or more temperature sensor signals to achieve an exhaust temperature sufficient for regeneration of the exhaust after treatment equipment.

17. The method as set forth in claim 16, comprising modifying exhaust gas flow through the turbo compound arrangement by reducing rotational speed of the turbo compound turbine.

18. The method as set forth in claim 16, wherein the turbo compound turbine is drivingly connected to a crankshaft of the engine, the method comprising modifying exhaust gas flow through the turbo compound arrangement by braking rotation of the turbo compound turbine.

19. The method as set forth in claim 16, comprising applying, via the brake, sufficient resistance to movement of the turbo compound turbine to prevent energy from being returned to the engine.

20. The method as set forth in claim 16, comprising applying, via the brake, sufficient resistance to movement of the turbo compound turbine to increase a load on the engine.

21. The method as set forth in claim 16, comprising modifying exhaust gas flow through the turbo compound arrangement by reducing flow through the turbo compound arrangement and the exhaust line in response to a temperature sensor signal that the temperature of the exhaust after treatment equipment is below a predetermined value to increase backpressure in the exhaust line upstream of the turbo compound turbine.

22. The method as set forth in claim 16, comprising modifying exhaust gas flow through the turbo compound arrangement by increasing flow through the turbo compound arrangement and the exhaust line in response to a temperature sensor signal that the temperature of the exhaust after treatment equipment is at or above a predetermined value to decrease backpressure in the exhaust line upstream of the turbo compound turbine.

23. The method as set forth in claim 16, wherein the turbo compound arrangement comprises a bypass conduit connected to the exhaust line upstream of the turbo compound turbine and a bypass valve movable from an open position in which flow to the turbo compound turbine is unrestricted and the bypass conduit is closed to a bypass position in which flow through the turbo compound turbine is restricted and the bypass conduit is opened, the method comprising restricting flow through the turbo compound arrangement by moving the bypass valve to the bypass position.

24. The method as set forth in claim 16, comprising modifying exhaust gas flow through the turbo compound arrangement by reversing a direction of rotation of the turbo compound turbine.

25. The method as set forth in claim 24, comprising reversing the direction of rotation of the turbo compound turbine by turning the turbo compound turbine with a motor separate from the engine for driving the turbo compound turbine in a reverse direction.

26. The method as set forth in claim 25, comprising, after driving the turbo compound turbine in the reverse direction with the motor, driving the turbo compound turbine in a forward direction with the motor.

27. The method as set forth in claim 25, wherein a power transmission arrangement connecting the turbo compound turbine to a crankshaft of the engine is provided, the method comprising reversing the direction of rotation of the turbo compound turbine by shifting the power transmission arrangement from a forward drive condition in which the turbo compound turbine is driven in a forward direction by gas flowing through the turbo compound turbine and a neutral drive condition in which the crankshaft and the turbo compound turbine are disengaged and the motor drives the turbo compound turbine in the reverse direction.

* * * * *